Figure 4:
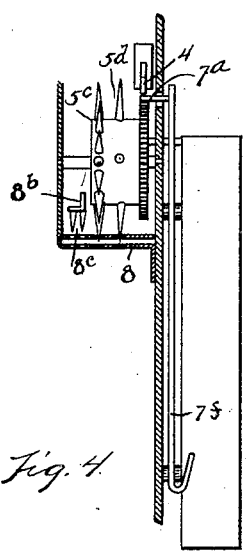

No. 651,856. Patented June 19, 1900.
A. T. HILL.
SPEED RECORDER.
(Application filed Feb. 26, 1900.)
(No Model.) 2 Sheets—Sheet 1.
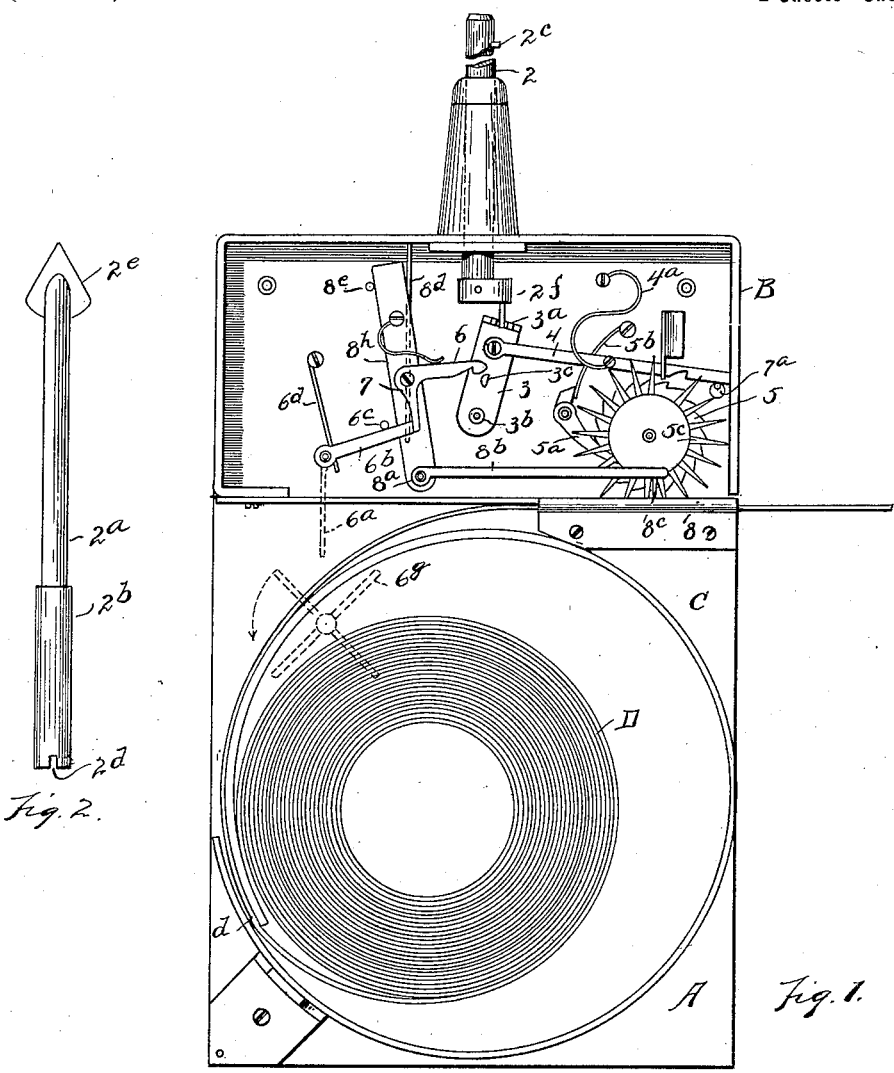
WITNESSES
Chas. E. Wiener
M. E. Kott
INVENTOR
Alva T. Hill
By Parker & Burton
Attorneys.

No. 651,856. Patented June 19, 1900.
A. T. HILL.
SPEED RECORDER.
(Application filed Feb. 26, 1900.)

(No Model.) 2 Sheets—Sheet 2.

WITNESSES
Chas. E. Wisner
M. E. Kott

INVENTOR
Alva T. Hill
By Parker & Burton
Attorneys.

United States Patent Office.

ALVA T. HILL, OF DETROIT, MICHIGAN.

SPEED-RECORDER.

SPECIFICATION forming part of Letters Patent No. 651,856, dated June 19, 1900.

Application filed February 26, 1900. Serial No. 6,448. (No model.)

*To all whom it may concern:*

Be it known that I, ALVA T. HILL, a citizen of the United States, residing at Detroit, county of Wayne, State of Michigan, have invented a certain new and useful Improvement in Instruments for Recording the Rotations of Shafts and Timing the Same; and I declare the following to be a full, clear, and exact description of the invention, such as will enable others skilled in the art to which it pertains to make and use the same, reference being had to the accompanying drawings, which form a part of this specification.

This invention relates to a speed-regulating instrument by means of which the revolutions of a shaft or axle are recorded by means of easily-read indicating characters and a side record is made indicating periods of time. The record is made by indentations or punctures through a strip of paper, and there are made three lines of indentations, one of which lines contains an indentation or puncture for each revolution of the shaft. A side line contains an indentation or puncture for each five revolutions of the shaft, and another side line contains an indentation or puncture or, as in the description of the present machine, two indentations or punctures at the end of each second of time that elapses during the time of record.

The instrument which embodies this invention, as it is hereinafter described, is arranged to produce the punctures, as just stated; but intermediate wheels may be interposed, so that the punctures will be multiples or dividends of the number of rotations of the shaft, if it be desired to change the recording instrument in that respect. It would not generally be useful to multiply the number of rotations, because where the rotation is slow the number of rotations can frequently be observed without the application of the instrument, although in such cases the instrument may sometimes be useful, because the record which it makes shows not only the number, but the regularity of the motion of the shaft to which it is applied.

In the register hereinafter described the rotation-indicating wheel is arranged to produce a puncture for nineteen out of twenty revolutions of the shaft, and the place on the record where the twentieth revolution would be punctured is left unpunctured. This is done that the record may be easily read, as it divides the punctures which record the revolutions of the shaft into sections of twenty each.

Figure 5:
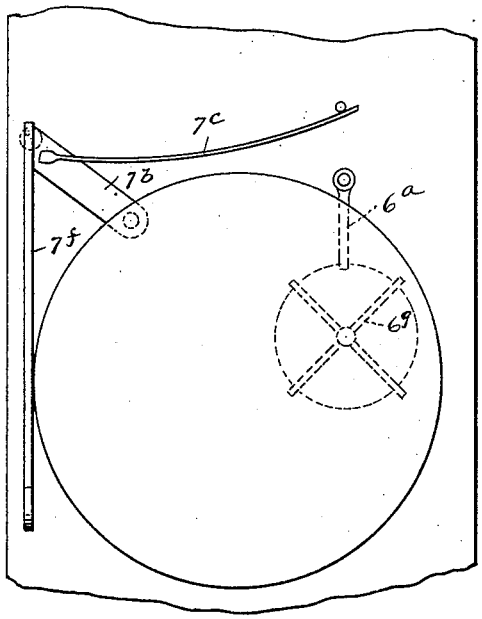
Figure 6:
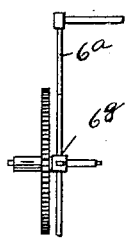
Figure 7:
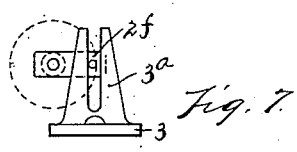
Figure 8:
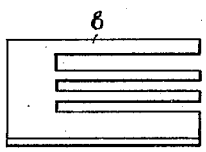

In the drawings, Figure 1 is a sectional elevation of the machine. This drawing is exaggerated and shows the machine about four times its actual size. Fig. 2 is a detail of the spear-point by means of which the recorder is engaged with the shaft, whose rotation it records. Fig. 3 represents a short portion of the record-strip. Fig. 4 is a side elevation of the puncturing-wheel and of the time-puncturing points. Fig. 5 is a back view of the device and indicates the connection between the watch mechanism and the recording mechanism, and it also shows the means by which the recording mechanism is thrown into engagement with the driving-shaft. Fig. 6 is a detail of the watch-wheel used to operate the time-record. Fig. 7 is a detail of the connection between the record-actuating wheel and the main shaft. Fig. 8 is a detail of the table over which the strip of record-paper travels.

The frame of the register consists of a plate A, on one side of which is mounted an ordinary watch-movement which, in general, need not be described, as only one portion of the watch-movement is changed, and the watch-movement which is used can be purchased as an article of commerce in the open market. On the opposite side of the plate is a case B, in which is contained the record-making wheel and the mechanism by means of which the record-making wheel is actuated from the driven shaft. On this side of the plate is also mounted a spiral casing C, within which is stored a coil of record-paper D. The end of the coil of record-paper is led from the storage-drum through the opening d and between a pair of slotted guides 8 under the record-making wheel, and the record-making wheel serves not only to produce the punctures of which the record consists, but also to draw the paper forward with a speed corresponding to the rotation of the record-making wheel.

2 indicates the main shaft, which is brought into engagement with the engine or wheel shaft whose rotations are to be counted. The engagement is made by means of a spear-point $2^a$, which for convenience is made separable from the shaft 2 and is engaged therewith by a sleeve-coupling $2^b$. The sleeve of the coupling has a notch $2^d$, that engages over a pin $2^c$ on the shaft 2. The detachable portion $2^a$ terminates with a spear-point $2^e$ or with any other suitable frictional means of engaging the shaft of the register with the shaft whose rotations are to be counted. That end of the shaft 2 which extends within the casing B is provided with a crank-pin $2^f$, that engages an oscillating lever 3. The engagement between the crank $2^f$ and the lever 3 is made by means of a fork $3^a$, (shown in detail in Fig. 7,) in which the wrist-pin of the crank engages, and as the wrist-pin travels around its center of rotation the fork and the lever with which the fork is connected oscillate on the pin $3^b$, which holds the lever 3 to the casing. The lever 3 has pinned to it a pawl 4, that can engage with a ratchet-wheel 5. The pawl 4 is thrown into engagement with the ratchet-wheel when it is desired to make a record. It is thrown out of engagement by means which will be hereinafter explained when the instrument is out of use. The oscillatory arm 3 has also a catch-post $3^c$, suitably arranged to engage with the hook 6, that is primarily actuated by the watch-movement. The pawl 4 is pressed toward and into engagement with the ratchet-wheel 5 by an S-shaped spring $4^a$.

A holding-pawl $5^a$ is pivoted to the case and held by a spring $5^b$ in engagement with the ratchet-wheel 5. The ratchet-wheel 5 has connected with it a drum of two zones from which project needle-pointed teeth. From one of the zones, $5^c$, (on Fig. 4,) project nineteen teeth, the periphery of this zone being divided into twenty spaces, from which nineteen teeth project, while the portion which would be occupied by the twentieth tooth is left vacant. From another zone, $5^d$, of the same wheel project four needle-pointed teeth, which are equally spaced around the zone, so that as this wheel rotates against the paper, with the teeth pressing through the strip of paper between the guides 8, the teeth from the zone $5^c$ make nineteen punctures and one space for each revolution, and the teeth projecting from the zone $5^d$ make four punctures for each revolution. The wheel itself is actuated by the reciprocation of the pawl 4, and this reciprocation is caused by the oscillation of the lever 3, and there is one complete oscillation of the lever 3 to each revolution of the shaft 2. The mechanism thus far described records in the advancing strip of paper a line of punctures, of which there is one for each revolution (skipping the twentieth) of the main shaft, and a second line of punctures of which there is one for every five revolutions of the main shaft.

The timing apparatus is introduced and the record of the time made in the same strip of paper and the registry is made by the apparatus, most of which is shown in Fig. 1. In an ordinary watch mechanism there is attached to the shaft of the seconds-hand a four-toothed wheel. This wheel in ordinary watches revolves once in sixty seconds. This wheel, sometimes called the "fourth wheel," is regulated by the escape-wheel, which ordinarily has fifteen teeth. In place of the fifteen teeth I make a one-toothed wheel, which causes the fourth wheel to revolve once in four seconds.

Fig. 6 shows a detail of this wheel, and $6^g$ indicates the four-toothed wheel, in the path of which hangs the end of a rock-arm $6^a$. The rock-arm $6^a$ is pivoted in the case B, and a branch from it, $6^b$, engages behind a bell-crank lever 7, that is mounted on the arm $8^h$ of a second bell-crank lever pivoted at $8^a$ in the case B. From the pivot $8^a$ a second branch $8^b$ extends to a point opposite and over the puncturing-place of the needle-points of the wheel 5, and the arm $8^b$ is provided with a pair of puncturing-points $8^c$, that normally lie over the guide 8 and in line with the line where punctures are made through that paper by the points of the wheel 5. Normally the arm $8^h$ is thrown back and the point end of the arm $8^b$ held away from the paper by a spring $8^d$, which holds the free end of the arm $8^h$ against the stop-post $8^e$. The bell-crank lever 7 is pinned to the arm $8^h$ and is normally at rest against the end of the rock-arm $6^b$, and this rock-arm $6^b$ can vibrate from the post $6^c$, to which it is normally held by a spring $6^d$, and can swing away from the post $6^c$ until it clears the end of the arm $6^b$. When this clearance is effected, the opposite end of the lever 7 is brought into engagement with the post $3^c$ on the oscillating arm 3, and a hook on the end of the rock-lever 7 engages over the post $3^c$. The next oscillation of the arm 3 toward the recording-wheel causes a corresponding oscillation of the arms $8^h$ and $8^b$ and causes the points $8^c$ to puncture the paper. On the return oscillation the time-wheel $6^g$ has passed out of engagement with the arm $6^a$ and the arm $6^b$ has swung back against the post $6^c$, and its end now engages against the lever 7 and holds the lever 7 out of engagement with the post $3^c$ during the interval which passes until another tooth of the wheel $6^g$ engages the arm $6^a$. During this interval the revolutions of the shaft have continued to be recorded on the paper.

The watch mechanism or time mechanism continues in action; but the advance of the paper and the recording of the revolutions of the shaft may be thrown out of action by the means of a push-rod $7^f$, which is on the back of the plate A and which is provided with a pin $7^a$, that engages through a hole in the plate A, under the end of the pawl 4, and may be regulated to allow the spring $4^a$ to hold the pawl against the ratchet-wheel, or may be used to force the pawl out of engagement with the ratchet-wheel against the tension of the spring $4^a$. The engaging end of the pushbar $7^f$ is held to its proper place by any well-known means, as by a radius-bar $7^b$, and it is held in place by friction aided by a spring $7^c$, if desired.

What I claim is—

1. In an instrument for recording the rate of rotation of a shaft, the combination of the main driving-shaft of the register, means for recording the rotation of said shaft adapted to be actuated by said shaft, a recording device adapted to be actuated by said shaft, a clock mechanism, and means connecting said clock mechanism with said recording device, whereby the latter is caused to indicate equal intervals of time, substantially as described.

2. In an instrument for recording shaft-revolutions, in combination with a means whereby the recorder is brought into working engagement with the shaft, a record-wheel provided with needle-pointed teeth, a recording-tape arranged to engage under the record-wheel and to be drawn forward thereby, and means for recording on said tape as it advances the expiration of consecutive intervals of equal time, substantially as described.

3. In an instrument for recording and timing the rotation of a shaft, the combination of the main driving-shaft of the register, a vibrating arm actuated thereby, a ratchet-wheel, carrying record-making indicators and adapted to be actuated by the vibrating arm, a clock-movement, a record-marking lever adapted to be drawn into connection with the mechanism which produces the record of shaft-rotations, a spring-actuated catch adapted to make such connection, a vibrating arm arranged to normally hold the catch out of its engaging position, and means whereby the said vibrating arm is shifted from its holding position at equal intervals of time, substantially as described.

4. In an instrument for recording the rate of rotation of a shaft, the combination of the main driving-shaft of the register, a vibrating arm actuated thereby, a ratchet-wheel carrying a record-making indicator, a pawl connected with said vibrating arm and adapted to engage with the teeth of said ratchet-wheel, means for sustaining said pawl in a position in which it shall not engage said teeth, a clock-movement, a record-marking lever adapted to be drawn into connection with the mechanism which produces the record of shaft-rotation, means regulated by said clockwork for connecting said record-marking lever with the mechanism which produces the record of shaft-rotation, and a tape for receiving the record adapted to be actuated by said ratchet-wheel, substantially as described.

5. In an instrument for recording the rotations of a shaft and the expirations of definite periods of time, the combination of a record-making wheel, actuated by the shaft whose rotations are counted, and a time-recorder actuated by the same shaft, the time-recorder being normally out of engagement with the shaft-actuated mechanism, but arranged to be set and brought into engagement with it by clock mechanism, substantially as described.

In testimony whereof I sign this specification in the presence of two witnesses.

ALVA T. HILL.

Witnesses:
JOHN N. GOODRICH,
CHARLES F. BURTON.